(12) United States Patent
Hanke

(10) Patent No.: US 6,168,525 B1
(45) Date of Patent: Jan. 2, 2001

(54) FLEXIBLE CLUTCH FOR A TWO-MASS FLYWHEEL

(75) Inventor: Wolfgang Hanke, Heidenheim (DE)

(73) Assignee: Voith Turbo GmbH & Co., KG, Heidenheim (DE)

(*) Notice: Under 35 U.S.C. 154(b), the term of this patent shall be extended for 0 days.

(21) Appl. No.: 09/190,654

(22) Filed: Nov. 12, 1998

(30) Foreign Application Priority Data

Nov. 14, 1997 (DE) .............................. 197 50 407

(51) Int. Cl.[7] .............................. F16D 3/80; F16D 13/64
(52) U.S. Cl. .................................................. 464/27; 464/68
(58) Field of Search .................... 464/24, 27, 66, 464/68

(56) References Cited

U.S. PATENT DOCUMENTS

| | | | |
|---|---|---|---|
| 4,739,866 | * 4/1988 | Reik et al. | 464/66 |
| 4,828,533 | * 5/1989 | Focueur et al. | 464/68 |
| 5,017,179 | * 5/1991 | Hanke et al. | 464/68 |
| 5,072,818 | * 12/1991 | Kuhne | 464/68 |
| 5,156,067 | * 10/1992 | Umeyama | 464/68 |
| 5,573,460 | 11/1996 | Toji . | |
| 5,743,371 | * 4/1998 | Takehira et al. | 464/24 |
| 5,935,007 | * 8/1999 | Yang | 464/24 |
| 5,997,402 | * 12/1999 | Fukushima et al. | 464/24 |

* cited by examiner

Primary Examiner—Lynne H. Browne
Assistant Examiner—Kenneth Thompson
(74) Attorney, Agent, or Firm—Taylor & Aust, P.C.

(57) ABSTRACT

A clutch for a two-mass flywheel of an internal combustion engine includes a first half-coupling and a second-half coupling. Both half-couplings are, within the bounds provided, torsionally twistable relative to the other. The half-couplings are connected to each other through elastic clutch elements. Side-disks form an inner, leakproof compartment containing a center disk. In the radially outer regions of the compartment resides at least one displacement chamber that is capable of being filled and which has a throttle orifice. The displacement chamber is bound circumferentially by two first tappets which are part of one half-coupling, as well as by a second tappet which is part of the other half-coupling. The second tappet divides the displacement chamber into two sectional chambers. At least one of the tappets includes a stationary tappet piece and a movable tappet piece which is movable in circumferential direction and delimits the respective partial chamber. The tappet piece which is movable in circumferential direction pushes against the force of a spring. The area between the two tappet pieces forms a third damping chamber.

5 Claims, 4 Drawing Sheets

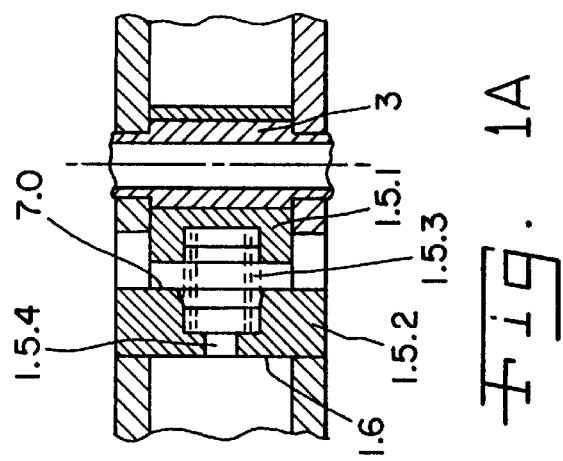
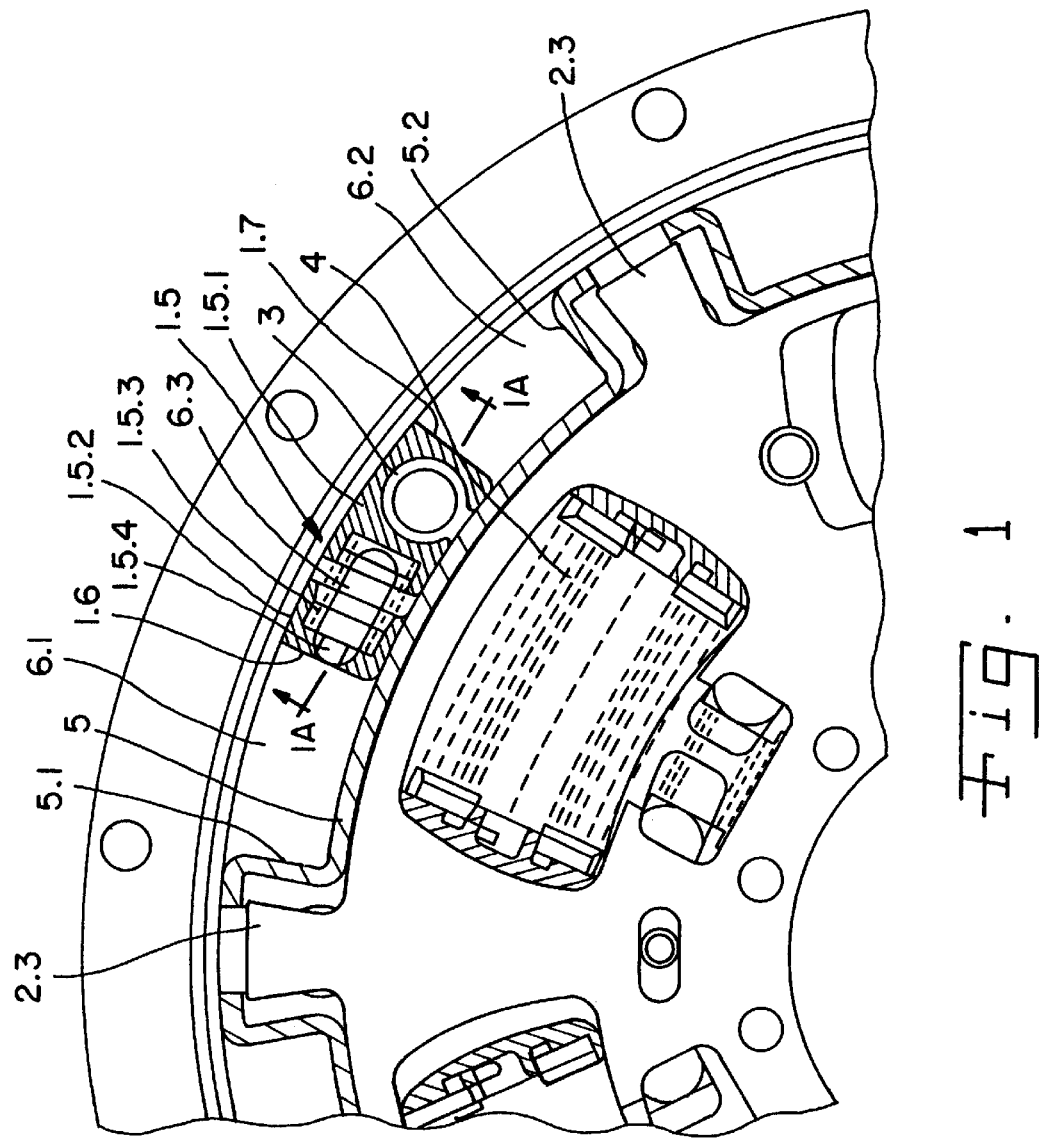

FLEXIBLE CLUTCH FOR A TWO-MASS FLYWHEEL

BACKGROUND OF THE INVENTION

1. Field of the Invention

The present invention relates to a flexible clutch, and, more particularly, a clutch for a two-mass flywheel of an internal combustion engine.

2. Description of the Related Art

A flexible clutch for a two-mass flywheel is known from German patent document number DE-PS 28 48 748. U.S. Pat. No. 5,573,460 depicts and describes a flexible, disk-type clutch including two half-couplings which are, within the bounds provided, torsionally twistable relative to each other. The two half-couplings are connected to each other through flexible clutch elements. In the outer radial region of an inner compartment there are displacement chambers which can be filled with a damping medium. Another similar clutch has been published in German patent document number DE 28 48 748.

Flexible clutches for a two-mass flywheel have the purpose of assuring running smoothness in drive units with internal combustion engines. This is especially true for vehicles, where smoothness is a prerequisite in all operating ranges and speed ranges. The drive train, particularly, should be free of adverse torsional vibration.

The elasticity of a clutch is selected so that the critical rotational speed associated with the mass systems of the engine and transmission is sufficiently below the operating range. In doing so, high amplitudes and torsional moments in the drive elements should be avoided when traversing through the critical speed range. A substantial contributor to the lowering of torsional vibration is a damping device which has been tuned to the drive train and is an integral part of the clutch. Damping is achieved hydraulically by displacing a damping medium through a defined slot. The problem here is that different torsional vibration signatures exist, depending on the type of engine (gasoline, diesel), number of cylinders, or cylinder arrangement (in-line, V).

While the selection of the number of springs for the clutch is primarily a function of the magnitude of the torque to be transmitted, the damping device, placed in parallel, cannot be sufficiently tuned for critical applications. It has been the experience that large relative angular torsional displacements cause significant amounts of damping medium to escape in an uncontrolled fashion through the axial slot into the inner part of the clutch, without significantly contributing to any damping.

This type of invention further includes an established disk-type clutch, described in German patent document number DE-GM 88 08 004, including one half-coupling that encompasses the other half by forming a sealed inner compartment which can be filled with a damping medium. There are displacement chambers with throttle slots, and the inner disks are segmented by separating walls on their outer periphery, through which radial surfaces on the disks submerge at a certain angular torsional displacement. Thereby, benefits will be realized in terms of damping torsional vibrations as a result of the enhanced matching capability to the operating conditions of the clutch, especially when it comes to matching the idle and full load conditions of the engine.

There are some operating conditions of drive trains that are susceptible to wear and damage of the individual component parts. It is well known that damage of the springs, which are part of the spring pack, is the consequence of the springs being coil-bound, meaning the spring coils are contacting each other at high pressures which, subsequently, leads to spring deformation. Also, a mutual hard contact of those tappet surfaces, which limit the damping chambers in circumferential direction, can lead to damage. This risk can be avoided by making the springs of the spring pack stiffer. This is, however, not desirable because a generally soft spring characteristic is needed in order to lower the resonance frequency as much as possible.

SUMMARY OF THE INVENTION

The present invention provides a clutch such that the striking moment is increased without having to change the spring design characteristics to match certain operating conditions.

Thereby, the stated problem is overcome in an effective fashion with relatively little design effort. Hard contacts on the applicable limit-stop surfaces at the end-regions of the circumferential backlash are avoided. The spring characteristic of the total system can thereby be relatively soft during the center portion of the angular torsional displacement and relatively hard in the end phase.

As a further measure, the respective tappet can be designed so that it not only embodies an additional energy accumulator but also an additional damping element.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a partial cross-section of one embodiment of the clutch of the present invention, perpendicular to its axis;

FIG. 1A is a sectional view taken at line 1A—1A in FIG. 1.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The example that is being illustrated shows a clutch which, as opposed to traditional torsional vibration dampers, includes a floating damping ring which is inserted between the two side-disks in the inner compartment. Also, the clutch is, within the bounds provided, torsionally twistable relative to both half-couplings.

Figure 2:
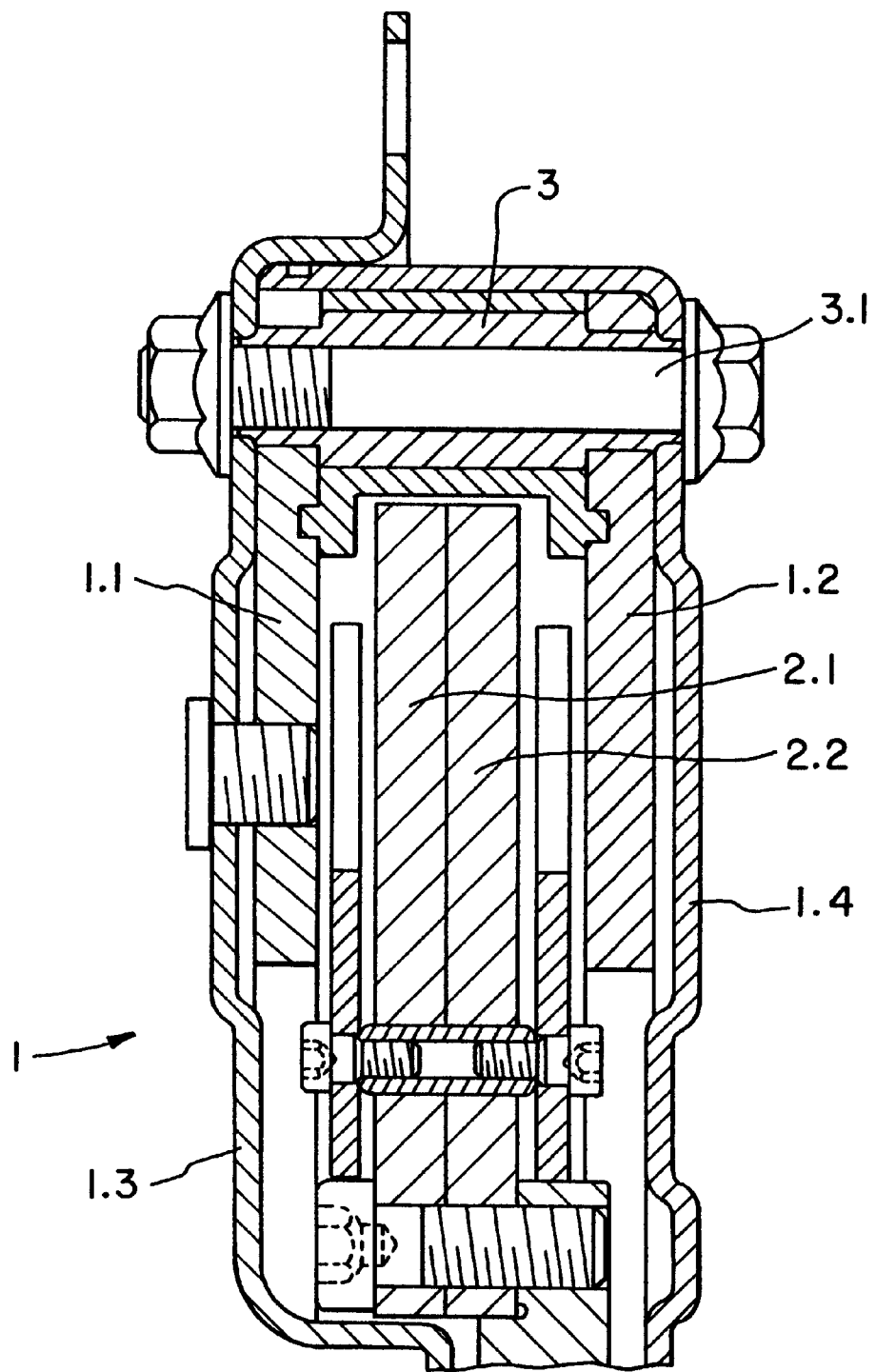
FIG. 2 is a cross-section of the clutch, parallel to its axis per FIG. 1.
Figure 3:
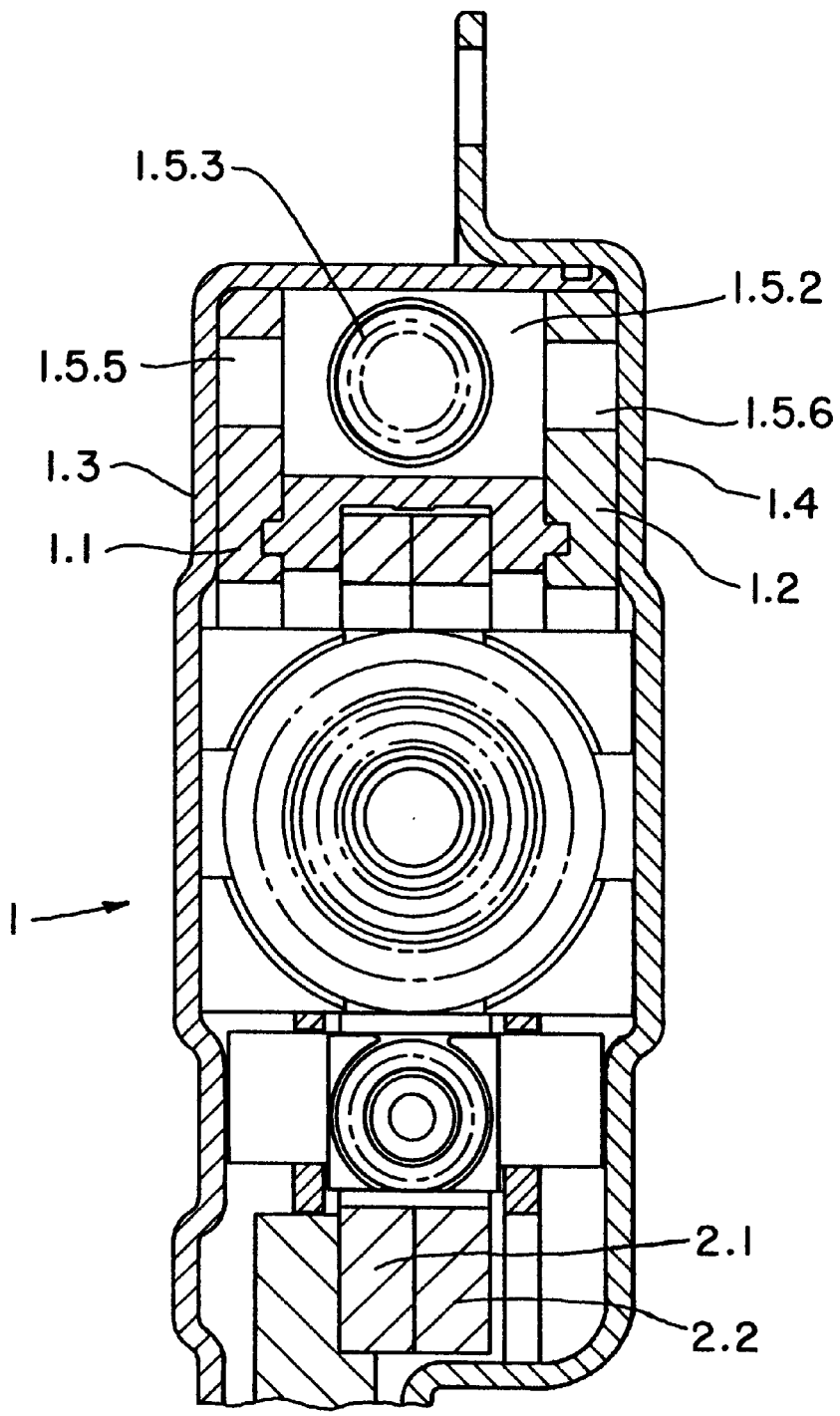
FIG. 3 is another cross-section of the clutch, parallel to its axis per FIG. 1.

Referring now to the drawings and particularly to FIGS. 1–3, there is shown a primary half-coupling 1 of the clutch, including two side-disks 1.1. and 1.2 and two additional housing components 1.3, 1.4 encompassing side-disks 1.1, 1.2.

Between the side-disks 1.1 and 1.2 resides a center disk 2, forming the essential part of the secondary half of the clutch. Center disk 2 is an assembly including two individual disks 2.1 and 2.2. Center disk 2 exhibits a plurality of tappets 2.3 on its circumference.

A spacer/centering bushing 3 penetrates directionally parallel to the axis of the clutch, through the entire unit in the circumferential area, and is locked in place with bolt 3.1. It is to be understood that there are several of these spacer/centering bushings 3 and bolts 3.1 along the circumference of the clutch.

FIG. 1, in particular, also shows a spring pack 4. There are several such spring packs 4 distributed along the circumference of the clutch.

The spacer/centering bushing 3 carries a tappet 1.5 which is part of the first half-coupling 1. Tappet 1.5 includes a fixed part 1.5.1 as well as a movable part 1.5.2, which is movable in circumferential direction. Between the two tappet pieces 1.5.1 and 1.5.2, resides a helper spring or overload spring 1.5.3 designed to force the two tappet pieces 1.5.1 and 1.5.2 apart. The helper spring 1.5.3 develops an additional force in the end region of the torsional twisting action of the two half-couplings 1, 2. Further discussion regarding this will be continued later.

In addition, the drawing shows the before-mentioned floating damping ring 5. It is located in axial direction in the area between the side-disks 1.1, 1.2. With respect to its radial location, damping ring 5 is located outside of the inner disk 2. As can be seen from FIG. 1, damping ring 5 includes limit-stop surfaces 5.1 and 5.2 in the form of right angle bends.

Tappet 1.5 is also provided with two limit-stop surfaces. One can recognize limit-stop surface 1.6 of the movable tappet piece 1.5.2 as well as the limit-stop surface 1.7 of the fixed tappet piece 1.5.1.

Between the limit-stop surfaces 5.1 and 1.6, as well as between limit-stop surfaces 1.7 and 5.2, reside sectional displacement chambers (sectional chambers) 6.1 and 6.2, respectively. During operation of the clutch, a limited relative angular torsional displacement of the two half-couplings 1 and 2 takes place in typical fashion. This has the consequence that the sectional chambers 6.1 and 6.2 are cyclically enlarged and reduced in the following manner: If the volume of the sectional chamber 6.1 reduces, the volume of sectional chamber 6.2 increases proportionally. The applicable limit-stop surfaces 1.6, 5.1 and 1.7, 5.2, move closer to each other or move apart from each other, respectively. This relative motion requires a force to be overcome.

Figure 4:
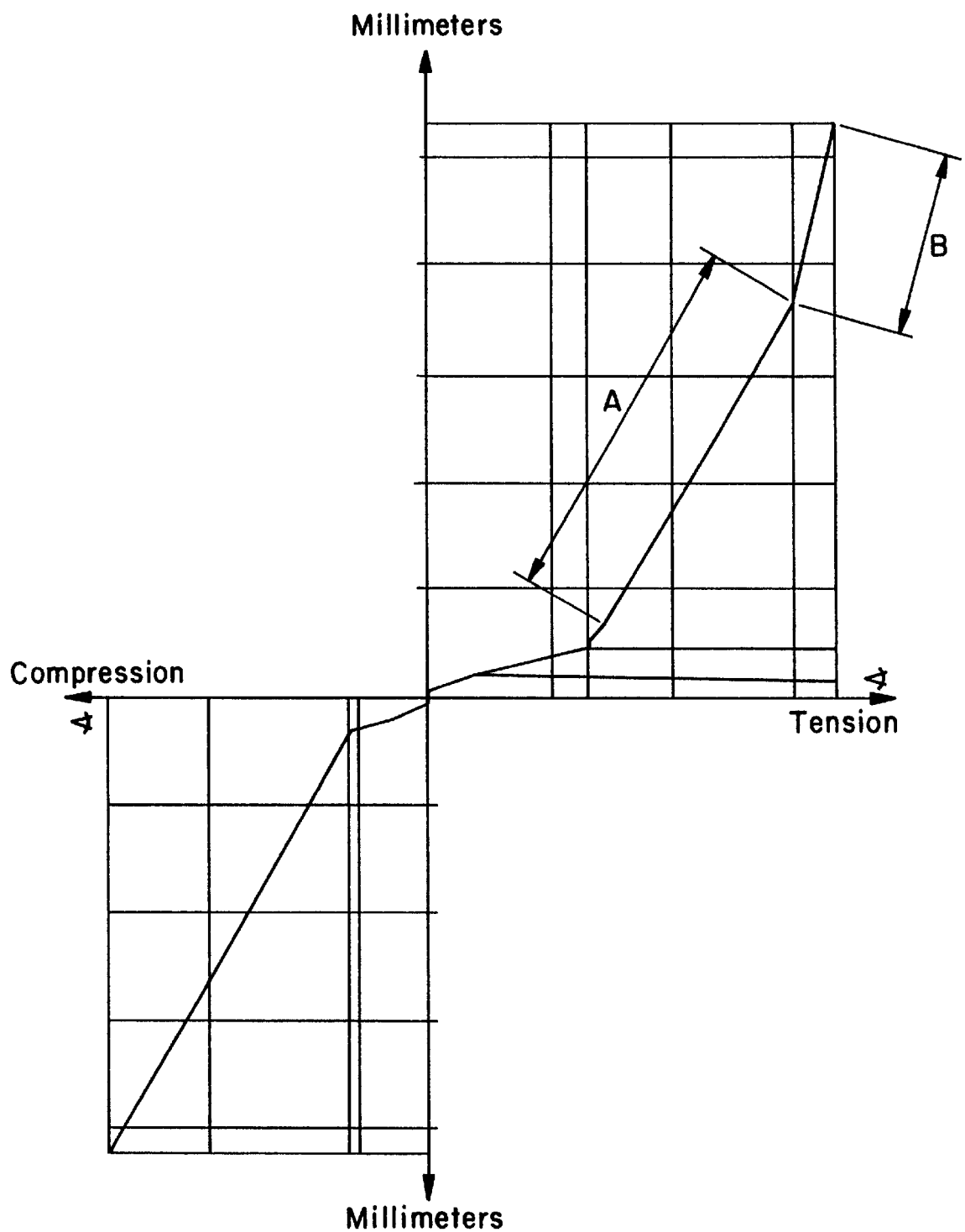
FIG. 4 is a plot of the spring characteristic which can be achieved with the present invention.

Due to the special design of tappet 1.5, the force increases in the last segment of the movement. The force-distance diagram is depicted by FIG. 4. Segment A is that segment that is associated with a relatively low spring rate. Segment B is that segment that is associated with a relatively high spring rate. This high spring rate is the result of the additional helper spring 1.5.3. In the end region of the torsional twisting action between the two half-couplings 1, 2, just prior to achieving contact between limit-stop surfaces 1.6 and 5.1, the helper spring 1.5.3 is being compressed.

Moreover, the tappet pieces can be designed such that the damping can be increased in this area. This is accomplished by making the damping slot of tappet 1.5 narrower as compared to the ones of the floating damping ring 5. Additionally, the cross-sectional area of the damping chamber 6.3 increases so that the damping volume enlarges, which, in turn, increases the damping. FIG. 1 depicts a bore 1.5.4 in the movable tappet piece 1.5.2. Furthermore, FIG. 3 depicts the shape of the movable tappet 1.5.2 in top view. As is evident, the movable tappet piece 1.5.2 includes a dowel pin 1.5.5, 1.5.6. on either side. Together with the dowel pin, the cross-sectional area generated by section A–A of the movable tappet piece 1.5.2 is larger than its limit-stop surface 1.6. The two dowel pins 1.5.5, 1.5.6 are piloted in elongated holes which are machined into the side-disks 1.1, 1.2 and positioned with the elongated side of the hole pointing in circumferential direction. In doing so, the dowel pin should be piloted in the elongated holes in a sealed manner.

The moving tappet piece 1.5.2 is surrounded by a viscous damping fluid which is exposed to a constant pressure on its entire surface. Due to the stated differences of the applicable surfaces, a hydrodynamic force develops as the surfaces 1.6 and 5.1 approach each other, which has the tendency to push the two tappet pieces 1.5.1 and 1.5.2 apart in the same way as the force of the spring 1.5.3 does.

This invention can be applied regardless of the number of disks. It is also not dependent on the use of the floating damping ring 5.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A flexible clutch for a two-mass flywheel of an internal combustion engine, said flexible clutch comprising:

a first half-coupling including two side-disks and an outer circumference torsionally solidly interconnecting said two side-disks;

a second half-coupling disposed between and surrounded by said two side-disks of said first half-coupling, said second half-coupling including at least one disk having a center hub;

a plurality of elastic clutch elements interconnecting said first half-coupling and said second half-coupling such that said first half-coupling and said second half-coupling are limitedly torsionally twistable relative to each other;

a substantially leakproof inner compartment defined by said two side-disks of said first half-coupling, said inner compartment receiving said at least one disk of said second half-coupling, said inner compartment including a plurality of radially outer regions having at least one displacement chamber with a throttle orifice, said at least one displacement chamber being configured for being filled;

two first tappets disposed on one of said first half-coupling and said second half-coupling;

a second tappet disposed on an other of said first half-coupling and said second half-coupling, said two first tappets and said second tappet circumferentially bounding said at least one displacement chamber of said radially outer regions, said second tappet dividing said displacement chamber into a first sectional chamber having a first volume and a second sectional chamber having a second volume, said first volume and said second volume alternately varying with relative twisting motion of said first half-coupling and said second half-coupling such that said first volume varies inversely with said second volume, at least one of said second tappet and said two first tappets comprising a stationary tappet piece and a movable tappet piece, said movable tappet piece being movable in a circumferential direction and delimiting a respective said sectional chamber;

a spring configured for exerting a force opposing movement of said movable tappet piece, said spring being circumferentially aligned between and coacting with said movable tappet piece and said stationary tappet piece; and a damping chamber defined by said stationary tappet piece and said movable tappet piece.

2. The flexible clutch of claim 1, wherein said at least one disk of said second half-coupling comprises a center disk.

3. The flexible clutch of claim 1, wherein said spring comprises a compression spring.

4. The flexible clutch of claim 1, wherein said movable tappet piece comprises a spring collar.

5. The flexible clutch of claim 1, further comprising at least one floating damping ring with opposed limit-stop surfaces, said at least one damping ring being positioned within one of said at least one displacement chamber of said radially outer regions, each of said opposed limit-stop surfaces being adjacent to one of said two first tappets.

* * * * *